United States Patent
Kobayashi et al.

(10) Patent No.: US 9,134,119 B2
(45) Date of Patent: Sep. 15, 2015

(54) OPTICAL FIBER ORIENTATION DETECTION METHOD AND APPARATUS

(71) Applicant: FUJITSU LIMITED, Kawasaki-shi, Kanagawa (JP)

(72) Inventors: Taizan Kobayashi, Kawasaki (JP); Katsuki Shirai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 14/081,217

(22) Filed: Nov. 15, 2013

(65) Prior Publication Data

US 2014/0175269 A1  Jun. 26, 2014

(30) Foreign Application Priority Data

Dec. 20, 2012  (JP) .................. 2012-278028

(51) Int. Cl.
| | |
|---|---|
| G01D 5/26 | (2006.01) |
| G01B 11/26 | (2006.01) |
| G01D 5/30 | (2006.01) |
| G01B 11/00 | (2006.01) |

(52) U.S. Cl.
CPC .............. *G01B 11/26* (2013.01); *G01B 11/002* (2013.01); *G01D 5/268* (2013.01); *G01D 5/30* (2013.01)

(58) Field of Classification Search
CPC ................. G01D 5/26; G01D 5/268
USPC ............ 250/227.11, 227.14, 227.24, 227.28, 250/227.29, 227.31, 227.32; 385/9, 39, 88, 385/89, 97
See application file for complete search history.

(56) References Cited

U.S. PATENT DOCUMENTS

2013/0236147 A1*  9/2013  Huang et al. ................. 385/97

FOREIGN PATENT DOCUMENTS

| JP | 07-301608 | 11/1995 |
|---|---|---|
| JP | 08-146242 | 6/1996 |
| JP | 2006-214753 | 8/2006 |

* cited by examiner

*Primary Examiner* — Kevin Pyo
(74) *Attorney, Agent, or Firm* — Staas & Halsey LLP

(57) ABSTRACT

A method is provided for detecting an orientation of an optical fiber including a flat surface as a part of a surface of the maintaining member. The method includes directing collimated light to the optical fiber through the flat surface of the maintaining member, receiving reflected light of the collimated light by using an optical sensor device, generating a brightness distribution image according to an output signal from the optical sensor device, identifying a reference point on a brightness distribution line appearing on the generated brightness distribution image, according to a position of the brightness distribution line in relation to a target orientation for the optical fiber, the brightness distribution line detectable on the brightness distribution image in correspondence to the reflected light received by the optical sensor device, and detecting the orientation of the optical fiber according to a coordinate of the reference point on the brightness distribution image.

7 Claims, 18 Drawing Sheets

FIG. 10A
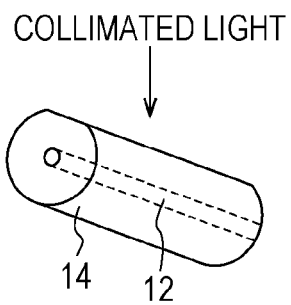
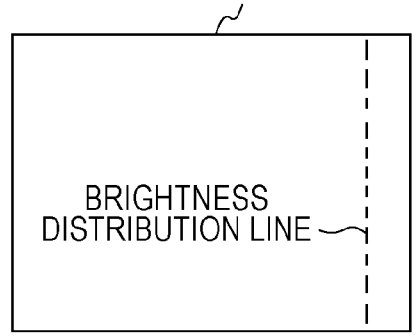
FIG. 10B
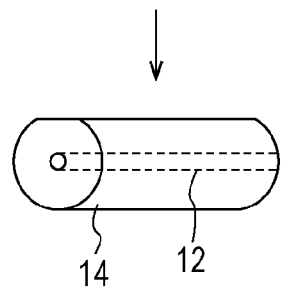
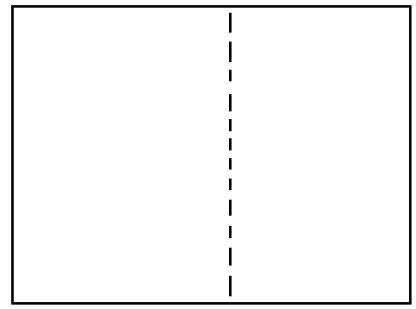
FIG. 10C
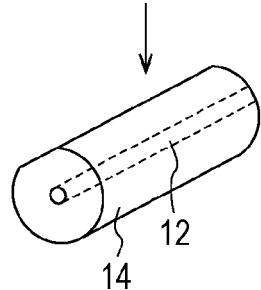
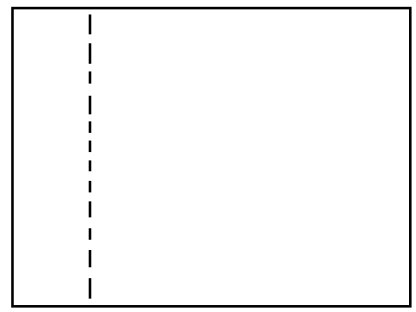

OPTICAL FIBER ORIENTATION DETECTION METHOD AND APPARATUS

CROSS-REFERENCE TO RELATED APPLICATION

This application is based upon and claims the benefit of priority of the prior Japanese Patent Application No. 2012-278028, filed on Dec. 20, 2012, the entire contents of which are incorporated herein by reference.

FIELD

The embodiments discussed herein are related to a method of detecting the orientation of an optical fiber and an apparatus.

BACKGROUND

Optical communication systems have come into widespread use and various types of optical modules are now in practical use. Examples of modules placed in practical use include modules including an optical modulator, an optical amplifier, an optical transmitter, an optical receiver, or an optical switch.

Commercially available optical modules include often an input optical fiber and an output optical fiber coupled thereto. The input optical fiber is optically coupled to the input end of an optical device such as, for example, an optical modulator, optical amplifier, optical transmitter, optical receiver, or optical switch in an optical module. The output fiber is optically coupled to the output end of the optical device. To reduce the coupling loss of the optical module, therefore, it is desirable to precisely align the ends of the input optical fiber and output optical fiber to the optical device.

When an optical module to which an optical fiber (an input optical fiber, an output optical fiber, or both) is connected is manufactured, the position of the end of the optical fiber is detected with respect to an optical device in the optical module. The position of the optical fiber is detected by, for example, using an electronic camera to photograph the optical fiber. The optical fiber is then aligned according to the detection result so as to reduce the coupling loss of the optical module.

As a related technology, a method is provided in which an optical part such as, for example, a waveguide, and an optical fiber are easily coupled with high precision (see Japanese Laid-open Patent Publication No. 8-146242, for example). In another method provided, the inclination of an end surface of a cylindrical member is highly precisely measured relative to the side surface of the cylindrical member (see Japanese Laid-open Patent Publication No. 2006-214753, for example). In still another method provided, a charge-coupled device (CCD) camera is used to inspect a defect on a thin film (see Japanese Laid-open Patent Publication No. 7-301608, for example).

SUMMARY

According to an aspect of the invention, a method of detecting an orientation of an optical fiber that is provided in an optical-transparent maintaining member including a flat surface as a part of a surface of the maintaining member, the method includes directing collimated light to the optical fiber through the flat surface of the maintaining member, receiving reflected light of the collimated light by using an optical sensor device, generating a brightness distribution image according to an output signal from the optical sensor device, identifying a reference point on a brightness distribution line appearing on the generated brightness distribution image, according to a position of the brightness distribution line in relation to a target orientation for the optical fiber, the brightness distribution line detectable on the brightness distribution image in correspondence to the reflected light received by the optical sensor device, and detecting the orientation of the optical fiber according to a coordinate of the reference point on the brightness distribution image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 10A to 10C illustrate examples of brightness distribution images generated with different $\theta x$ values;

DESCRIPTION OF EMBODIMENTS

Preliminary Consideration

To reduce the coupling loss in the optical module described in the background, it is desirable to appropriately adjust not only the position of the end of the optical fiber but also its orientation. The orientation of the optical fiber is represented by $\theta x$, $\theta y$, and $\theta z$ illustrated in FIG. 1.

Figure 1:
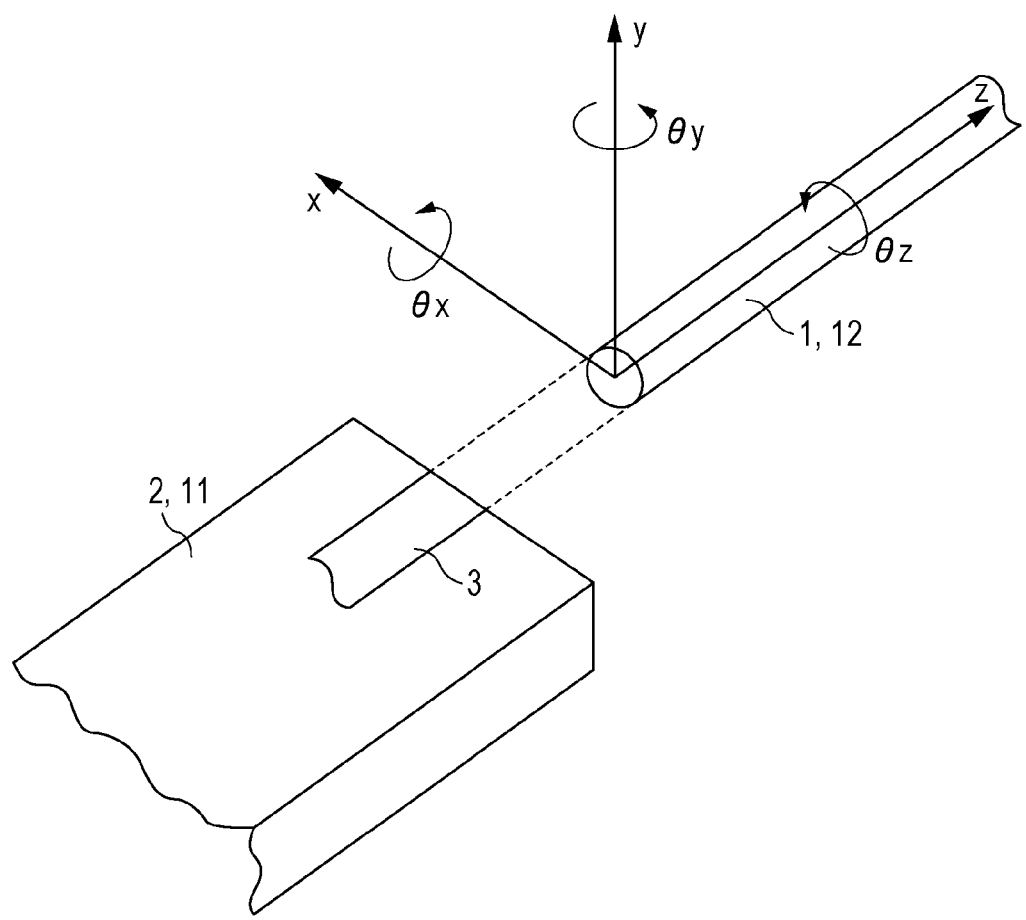
FIG. 1 illustrates the orientation of an optical fiber.
Figure 2A:
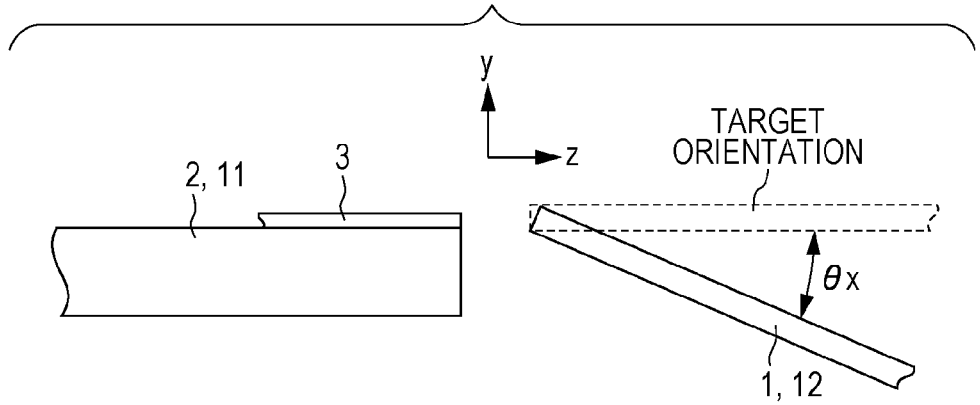
FIGS. 2A, 2B, and 2C illustrate $\theta x$, $\theta y$, and $\theta z$, which represent an orientation of the optical fiber.
Figure 2B:
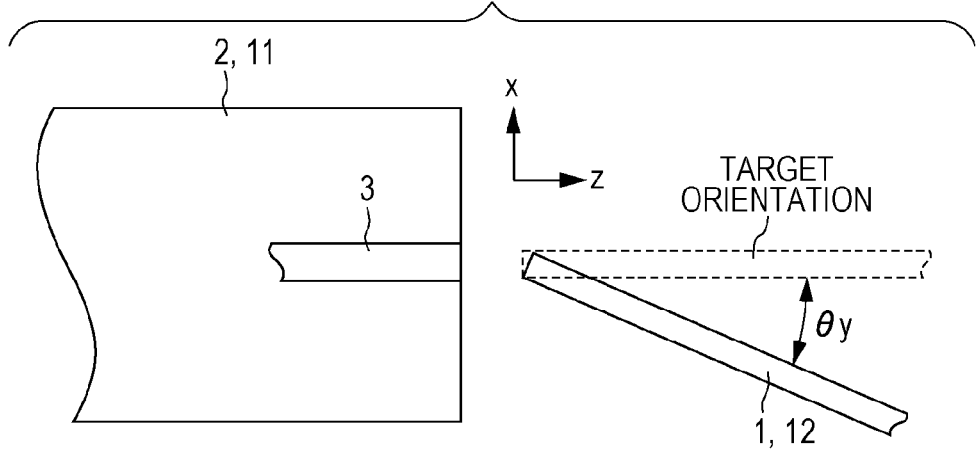
Figure 2C:
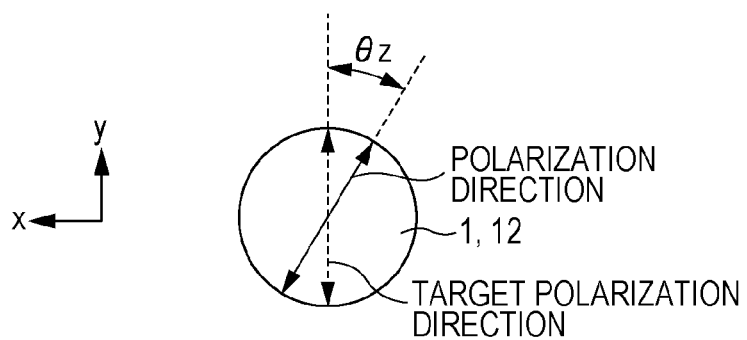

In FIG. 1, the optical fiber 1 is assumed to have been ideally aligned to an optical waveguide 3 formed in an optical device 2. The origin of the xyz coordinate system in FIG. 1 is set at the end of the optical fiber 1. The z-axis indicates a propagation direction of optical signals. The x- and y-axes are each set on a plane the normal of which is the z-axis. The x- and y-axes are mutually orthogonal. The y-axis is set in a direction perpendicular to the mounting surface of the circuit board of the optical device 2.

θx represents a rotational angle around the x-axis. FIG. 2A illustrates a state in which the optical fiber 1 has been rotated through θx from a target orientation. In FIG. 2A, the x-axis has been set in a direction perpendicular to the drawing sheet.

θy represents a rotational angle around the y-axis. FIG. 2B illustrates a state in which the optical fiber 1 has been rotated through θy from the target orientation. In FIG. 2B, the y-axis has been set in a direction perpendicular to the drawing sheet.

θz represents a rotational angle around the z-axis. FIG. 2C illustrates a state in which the optical fiber 1 has been rotated through θz from the target orientation. In FIG. 2C, the z-axis has been set in a direction perpendicular to the drawing sheet.

In the method in which an electronic camera is used to photograph the optical fiber, however, it is difficult to detect θx, θy, and θz. When, for example, the optical device 2 and optical fiber 1 are photographed from above the optical device 2, it is difficult to detect θx and θz from image data obtained by the photography.

It may be possible to detect the orientation of the target object by using an auto collimator. The auto collimator directs collimated light to the target object and detects light reflected from the target object by using an optical sensor device such as, for example, a charge-coupled device (CCD) sensor. A brightness distribution image is generated according to output signals from the optical sensor device. When this brightness distribution image is analyzed, therefore, it may be possible to identify the position or orientation of the target object.

When, for example, collimated light with a certain beam diameter is directed to a flat surface of the target object, light reflected from the target object is also collimated light having substantially the same beam diameter. Accordingly, a high-brightness point appears at coordinates corresponding to a position at which the reflected light has been detected. The angle of the flat surface (or the direction of the normal to the flat surface) is detected according to the coordinates of the high-brightness point on the brightness distribution image and the orientation of the target objects thereby detected.

However, the optical fiber is formed in a thin, substantially rod shape. When collimated light with a certain beam diameter is directed to the optical fiber, therefore, light rays are led in different directions depending on the positions on the optical fiber to which the light rays have been directed. For this reason, a high-brightness point does not appear on the brightness distribution image. In the method in which collimated light reflected on a flat surface is used to detect the angle of the flat surface, it is difficult to detect the orientation of the optical fiber (that is, the set angle of the optical fiber).

Accordingly precisely detecting the orientation of an optical fiber is desired.

Figure 3A:
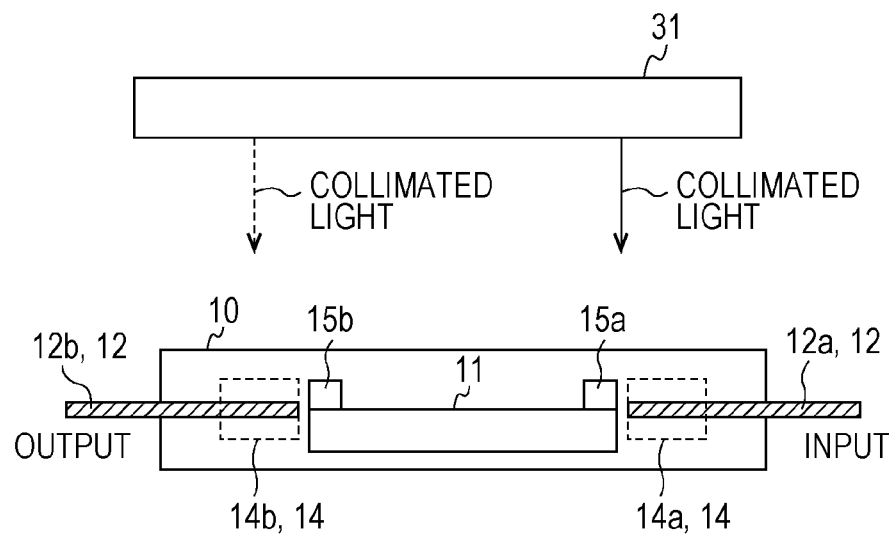
FIGS. 3A and 3B illustrate an example of an optical module.
Figure 3B:
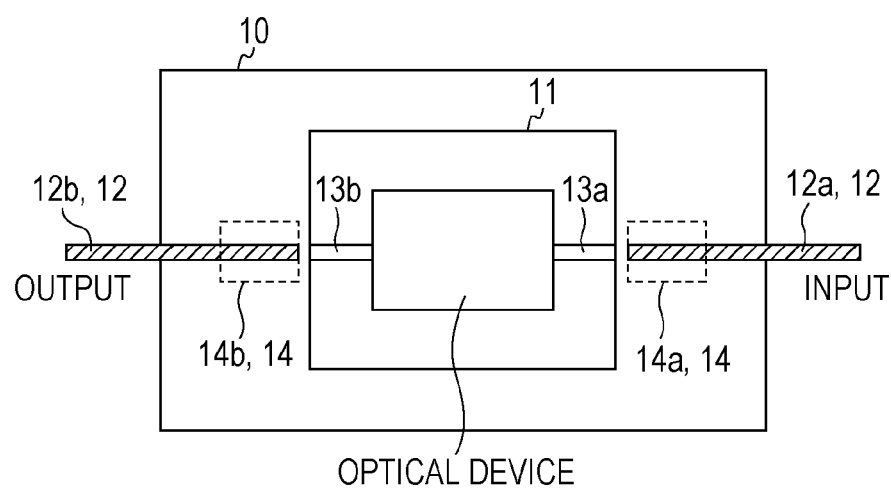

The embodiments will be described. FIGS. 3A and 3B illustrate an example of an optical module to which an orientation detection method in an embodiment of the present disclosure is applied. FIG. 3A illustrates an optical module 10 as viewed from its side and FIG. 3B illustrates the optical module 10 as viewed from above.

The optical module 10 includes an optical device chip 11. An optical device is mounted on a surface of the optical device chip 11. Although there is no particular restriction on the optical device, it is, for example, an optical modulator, optical amplifier, optical transmitter, optical receiver, optical switch, or other device. When an optical modulator is mounted on the surface of the optical device chip 11, the optical device chip 11 is implemented by, for example, a Low Noise chip (LN chip). In this case, for example, an interferometer, a wire through which a driving signal is transferred, an electrode to which the driving signal is given, an optical waveguide, which is optically coupled to the interferometer, and the like are formed on the surface of the LN chip.

An input optical fiber 12a and an output optical fiber 12b are attached to the optical module 10. The input optical fiber 12a is optically coupled to an input optical waveguide 13a of the optical device chip 11. The output optical fiber 12b is optically coupled to an output optical waveguide 13b of the optical device chip 11.

The end of the input optical fiber 12a is accommodated in a ferrule 14a. The ferrule 14a is secured to the optical device chip 11 with the input optical fiber 12a aligned to the input optical waveguide 13a of the optical device chip 11. In this example, however, an auxiliary member (jig) 15a is attached to the surface of the optical device chip 11. The ferrule 14a is secured to the optical device chip 11 and auxiliary member 15a with, for example, an adhesive.

Similarly, the end of the output optical fiber 12b is accommodated in a ferrule 14b. The ferrule 14b is secured to the optical device chip 11 with the output optical fiber 12b aligned to the output optical waveguide 13b of the optical device chip 11. In this example, however, an auxiliary member (jig) 15b is attached to the surface of the optical device chip 11. The ferrule 14b is secured to the optical device chip 11 and auxiliary member 15b with, for example, an adhesive.

In FIG. 3A, the input optical waveguide 13a and output optical waveguide 13b are not illustrated. In FIG. 3B, the auxiliary members 15a and 15b are not illustrated. In the description below, the input optical fiber 12a and output optical fiber 12b may be referred to as the optical fiber 12, the input optical waveguide 13a and output optical waveguide 13b may be referred to as the optical waveguide 13, and the ferrules 14a and 14b may be referred to as the ferrule 14.

Figure 4A:
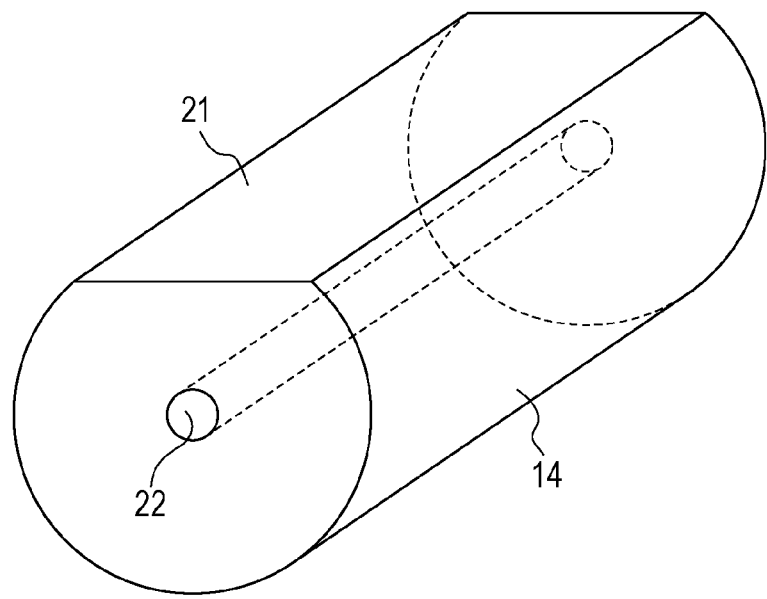
FIGS. 4A and 4B illustrate the structure of a ferrule.
Figure 4B:
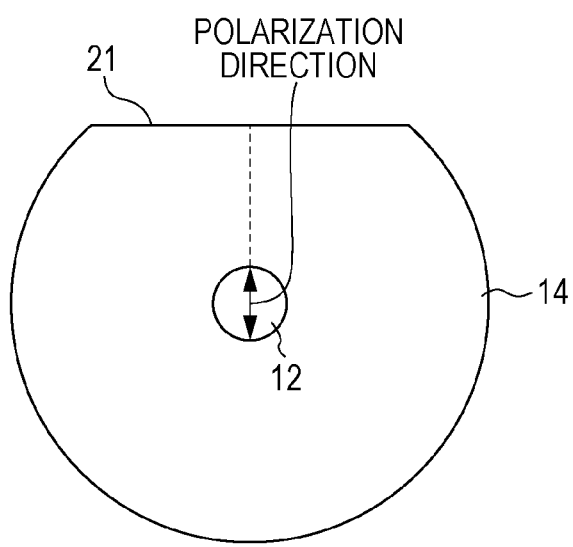

FIGS. 4A and 4B illustrate the structure of the ferrule 14. FIG. 4A is a perspective view of the ferrule 14, and FIG. 4B is a cross-sectional view of the ferrule 14. The ferrule 14 is formed in a substantially cylindrical shape. However, an orientation flat 21 is formed on part of the side surface of the cylinder. The orientation flat 21 is a flat surface formed on the side surface of the ferrule 14 as an aid to detect the orientation of the ferrule 14. The ferrule 14 accommodates the optical fiber 12 along the central axis of the cylinder. That is, the ferrule 14 is an example of a maintaining member that accommodates the optical fiber 12. In FIG. 4A, a through-hole 22 is drawn in which the optical fiber 12 is accommodated. The ferrule 14 is made of a transparent material. An example of the material of the ferrule 14 is glass. However, the ferrule 14 and the cladding of the optical fiber 12 have different refractive indexes.

Although there is no particular restriction on the optical fiber 12 accommodated in the ferrule 14, the optical fiber 12 is a polarization maintaining fiber in this example. In this case, as illustrated in, for example, FIG. 4B, the optical fiber 12 is accommodated in the ferrule 14 so that the polarization direction of the optical fiber 12 is substantially perpendicular to the orientation flat 21 of the ferrule 14. Although there is no particular restriction on the optical fiber 12 accommodated in the ferrule 14 as described above, the optical fiber 12 is assumed not to be coated in this example. That is, the core and cladding of the optical fiber 12 are accommodated in the ferrule 14.

The ferrule 14, in which the optical fiber 12 is accommodated, is secured to the optical device chip 11 so that the mounting surface of the optical device chip 11 and the orientation flat 21 of the ferrule 14 become parallel or substantially parallel to each other. Specifically, each ferrule 14 is secured to the optical device chip 11 and its corresponding auxiliary member 15a or 15b with an adhesive.

Figure 5:
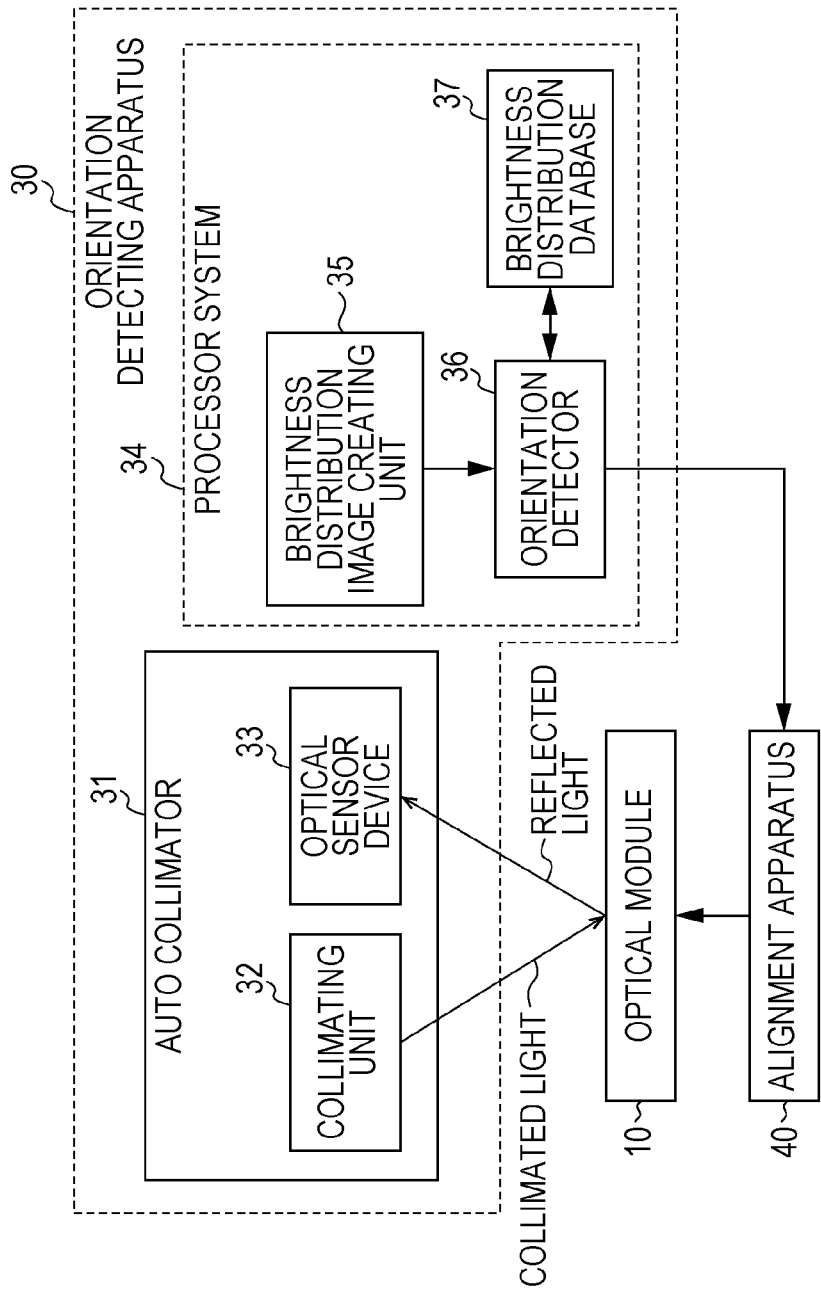
FIG. 5 illustrates the structure of the orientation detecting apparatus.

FIG. 5 illustrates the structure of an orientation detecting apparatus in an embodiment of the present disclosure. The orientation detecting apparatus 30 in the embodiment includes an auto collimator 31 and a processor system 34. The auto collimator 31 includes a collimating unit 32 and an optical sensor device 33. The collimating unit 32 includes a laser light source that generates laser light with a certain wavelength and also includes an optical system that generates collimated light with a certain beam diameter from the laser light. The collimated light generated by the collimating unit 32 is directed to the target object to be detected. The target object to be detected is the optical waveguide fiber 12 (that is, the input optical fiber 12a and output optical fiber 12b of the optical module 10).

The optical sensor device 33 receives the light reflected on the optical fiber 12 where the light is the collimated light generated by the collimating unit 32. Since the optical fiber 12 is accommodated in the transparent ferrule 14, the optical sensor device 33 receives reflected light from the optical fiber 12 and reflected light from the ferrule 14. The optical sensor device 33 is implemented by, for example, a CCD sensor or a complementary metal oxide semiconductor (CMOS) sensor.

The processor system 34 includes a brightness-distribution-image creating unit 35 and an orientation detector 36. The brightness-distribution-image creating unit 35 creates a brightness distribution image according to the output signal from the optical sensor device 33. The orientation detector 36 detects the orientations of the optical fibers 12 (12a and 12b) according to the brightness distribution image created by the brightness-distribution-image creating unit 35. The processor system 34 provides functions of the brightness-distribution-image creating unit 35 and orientation detector 36 by, for example, executing a software program. In this case, the software program is stored in, for example, a memory provided in the processor system 34 or a memory accessible to the processor system 34.

The processor system 34 includes a brightness-distribution database 37. The brightness-distribution database 37 stores data that represents a reference distribution pattern, which will be described later. The brightness-distribution database 37 may be disposed outside the processor system 34. In this case, the brightness-distribution database 37 accesses the brightness-distribution database 37 and obtains the reference distribution pattern.

Although, in the example illustrated in FIG. 5, the processor system 34 creates the brightness distribution image, the present disclosure is not limited to this configuration or structure. For example, the auto collimator 31 may include a function that generates the brightness distribution image, and the processor system 34 may use the brightness distribution image generated by the auto collimator 31 to detect the orientation of the optical fiber 12. In this case, the processor system 34 may lack the brightness-distribution-image creating unit 35.

The alignment apparatus 40 adjusts the positions and orientations of the optical fibers 12 (12a and 12b). During this adjustment, the alignment apparatus 40 places the optical module 10 below the auto collimator 31. That is, the optical module 10 is placed so that collimated light is directed from above the auto collimator 31 to the optical fiber 12 and ferrule 14. In the adjustment of the positions of the fibers 12a and output optical fiber 12b, the alignment apparatus 40 respectively aligns the ends of the fibers 12a and 12b to their corresponding optical waveguides 13a and 13b. In the adjustment of the orientations of the input optical fiber 12a and input optical fiber 12b, the alignment apparatus 40 references the detection result obtained from the orientation detecting apparatus 30.

Depending on the structure of the optical module 10, collimated light may be directed to the optical module 10 only from one direction. To simplify a manufacturing process of the optical module 10, it is desirable to detect the orientation of the optical fiber 12 by directing collimated light to the optical module 10 from the one direction. For these reasons, in the orientation detection method in the embodiment, the orientation of the optical fiber 12 is detected by directing collimated light to the optical fiber 12 from the one direction. In this example, when the orientation of the optical fiber 12 is detected, the optical module 10 is placed below the auto collimator 31 as illustrated in FIG. 3A. That is, when the orientation of the optical fiber 12 is detected, the optical module 10 receives collimated light from above.

The orientation detecting apparatus 30 may concurrently detect the orientations of the fibers 12a and 12b to adjust their orientations. Alternatively, the orientation detecting apparatus 30 may detect the orientations of the fibers 12a and 12b one at a time to adjust their orientations.

Figure 6A:
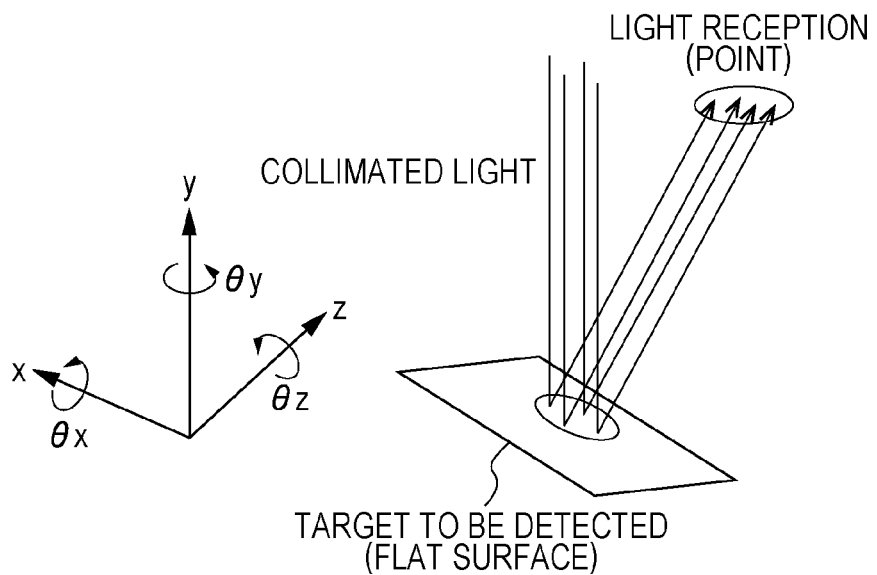
FIGS. 6A and 6B illustrate a method in which an auto collimator is used to detect the orientation of a target object.
Figure 6B:
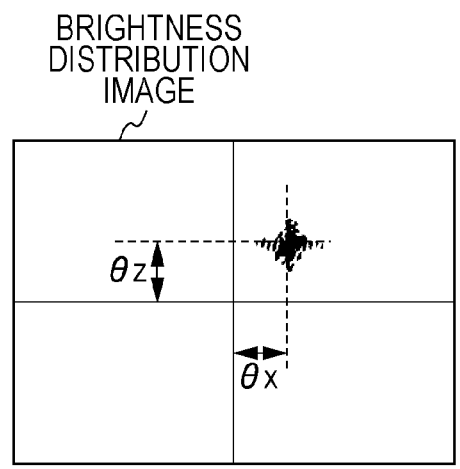

FIGS. 6A and 6B illustrate a method in which the auto collimator 31 is used to detect the orientation of the target object. In this example, collimated light having a certain beam diameter is directed to the flat surface, as illustrated in FIG. 6A. In this case, light reflected from the target object is also collimated light having substantially the same beam diameter. Accordingly, when the optical sensor device 33 receives the reflected light of the collimated light, a high-brightness point corresponding to the reflected light appears on the brightness distribution image, as illustrated in FIG. 6B. The coordinates of this high-brightness point correspond to the position at which the optical sensor device 33 has detected the reflected light. Accordingly, the coordinates of the high-brightness point represent the orientation of the target object. When, for example, it is assumed that the xyz ordinate system illustrated in FIG. 6A has been defined and collimated light parallel to the y-axis is directed to the target object, then coordinate θx in the horizontal direction on the brightness distribution image represents an angle through which the target object has been rotated around the x-axis. Similarly, coordinate θz in the horizontal direction on the brightness distribution image represents an angle through which the target object has been rotated around the z-axis. The auto collimator 31 is be used to detect the orientation of the target object in this way.

Figure 7:
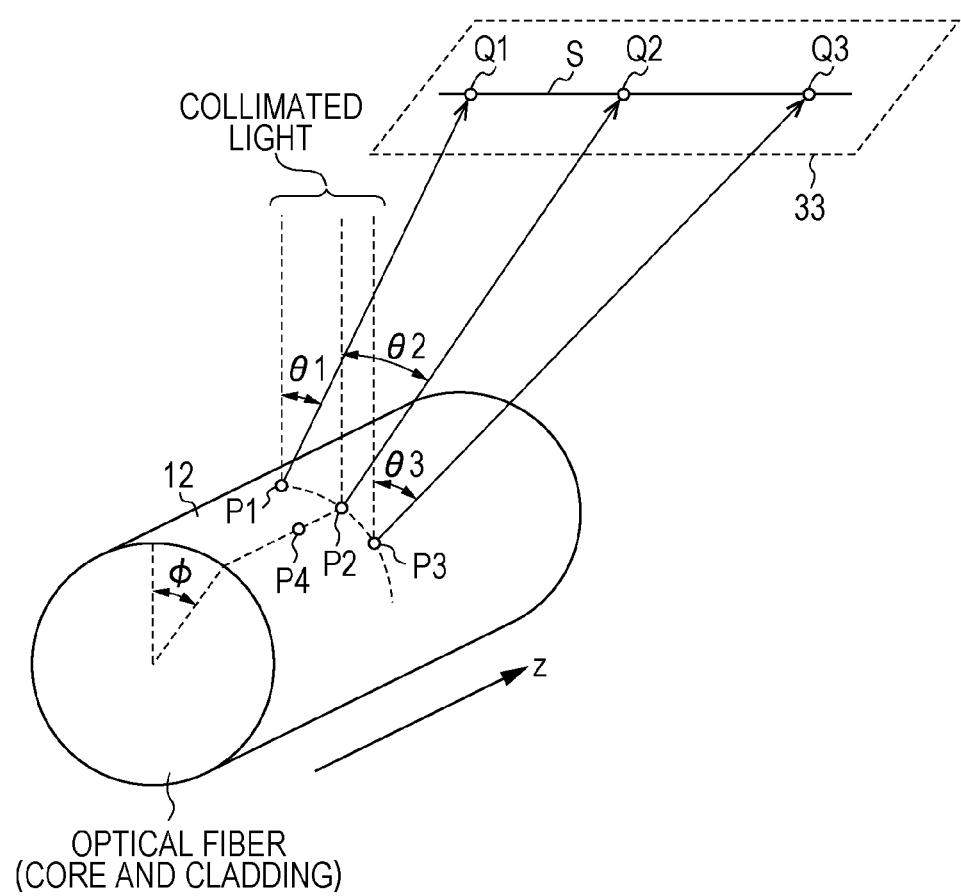
FIG. 7 illustrate light reflected when collimated light is directed to the optical fiber.

FIG. 7 illustrate light reflected when collimated light is directed to the optical fiber 12. The optical fiber 12 is formed in a cylindrical or substantially cylindrical shape with a certain diameter. The collimated light has a certain beam diameter. Accordingly, light rays are led in different directions depending on the positions, on the side surface of the optical fiber 12, to which the light rays have been directed, as illustrated in FIG. 7. For example, reflected light of a collimated light ray directed to point P1 is led to angle θ1. Similarly, reflected light of a collimated light ray directed to point P2 is led to angle θ2, and reflected light of a collimated light ray directed to point P3 is led to angle θ3. When the optical axial direction of the optical fiber 12 is the z direction, the z coordinates at points P1 to P3 are the same.

The reflected light of the collimated light is received by the optical sensor device 33. Specifically, the reflected light rays of the collimated light rays are led on a single straight line on the light receiving surface of the optical sensor device 33. For example, the reflected light rays from points P1 to P3 are respectively led to points Q1 to Q3 on the optical sensor device 33. Points Q1 to Q3 are aligned on a straight line S.

Collimated light rays may be directed to positions having the same rotational angle φ illustrated in FIG. 7. Even when these collimated light rays are directed to different positions in the optical axial direction (z direction in FIG. 7) of the optical fiber 12, the reflected light rays of the collimated light rays are led substantially in the same direction. For example, points P2 and P4 have the same rotational angle φ relative to the center of the optical fiber 12. In this case, a reflected light ray from point P2 and a reflected light ray from point P4 are led in the same direction. Accordingly, the reflected light ray of the collimated light ray directed to point P4 is led to a point near point Q2 on the optical sensor device 33. When collimated light having a certain beam diameter is directed to the side surface of the optical fiber 12, therefore, reflected light rays are not detected along the straight line S on the optical sensor device 33.

Figure 8:
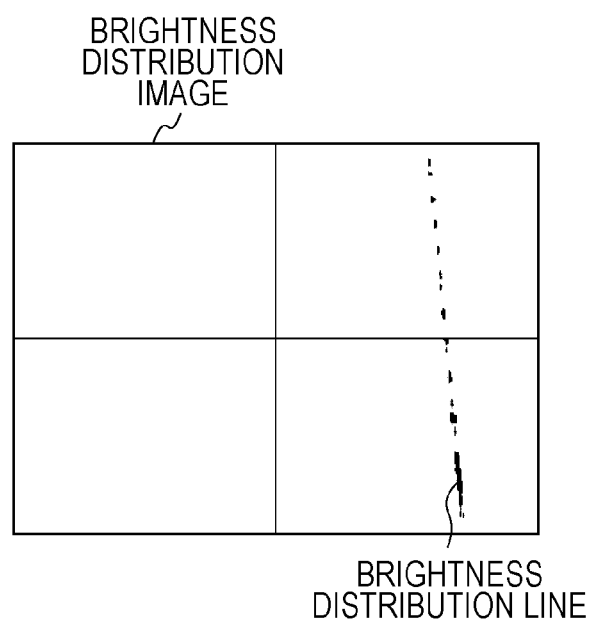
FIG. 8 illustrates an example of a brightness distribution image obtained when collimated light is directed to the optical fiber.

FIG. 8 illustrates an example of a brightness distribution image obtained when collimated light is directed to the optical fiber 12. In FIG. 8, high-brightness pixels are represented in black.

The brightness distribution image is created according to output signals from the optical sensor device 33, as described above. The reflected light from the optical fiber 12 is detected by the optical sensor device 33 along the straight line S. On the brightness distribution image, therefore, a brightness distribution pattern corresponding to the reflected light forms a substantially straight line. That is, a substantially straight brightness distribution pattern is obtained on the brightness distribution image. In the description below, a linear brightness distribution pattern, which appears on the brightness distribution image due to reflected light, may be referred to as a brightness distribution line.

Figure 9A:
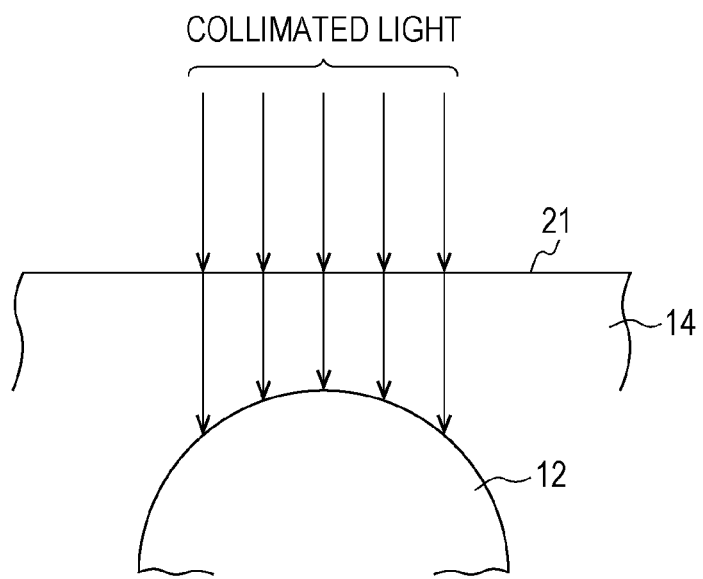
FIGS. 9A and 9B illustrate reflection from the optical fiber and ferrule.

As described above, the optical fiber 12 is accommodated in the ferrule 14. That is, the collimated light is directed through the ferrule 14 to the optical fiber 12, as illustrated in FIG. 9A. Specifically, the collimated light is directed to the orientation flat 21 of the ferrule 14. The collimated light is assumed to be directed substantially perpendicular to the orientation flat 21.

Figure 9B:
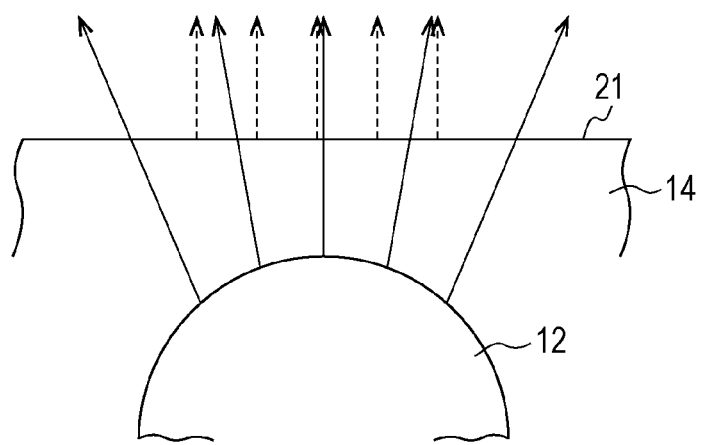

When directed to the optical fiber 12, therefore, the collimated light is also reflected by the ferrule 14 as illustrated in FIG. 9B. In FIG. 9B, the solid arrows represent reflected light rays from the optical fiber 12 and the dotted arrows represent reflected light rays from the ferrule 14. The reflected light from the ferrule 14 is also led to the optical sensor device 33. The reflected light from the optical fiber 12 and the reflected light from the ferrule 14 mutually interfere. When collimated light is directed to the optical fiber 12, therefore, the brightness distribution line, which appears on the brightness distribution image due to reflected light, has an interference fringe as illustrated in FIG. 8. The interference fringe pattern of the brightness distribution line is determined according to the diameter and material of the optical fiber 12, the shape and material of the ferrule 14, and other properties.

As described above, the orientation detecting apparatus 30 in the embodiment directs collimated light to the optical fiber 12 accommodated in the ferrule 14 and detects reflected light of the collimated light by using the optical sensor device 33. The orientation detecting apparatus 30 then creates a brightness distribution image from output signals supplied from the optical sensor device 33. Therefore, the orientation detecting apparatus 30 detect the orientation of the optical fiber 12 according to the brightness distribution line appearing on the brightness distribution image.

Next, relationships between the brightness distribution and the orientation of the optical fiber 12 will be described with reference to FIGS. 10A to 10C, 11A to 11C, and 12A to 12C. It will be assumed here that the xyz coordinate system illustrated in FIGS. 1 and 2A to 2C has been set. Collimated light parallel to the y-axis is assumed to be directed to the optical fiber 12 and ferrule 14. The optical fiber 1 and optical device 2 in FIGS. 1 and 2A to 2C correspond to the optical fiber 12 (12a and 12b) and the optical device chip 11.

FIGS. 10A to 10C illustrate examples of brightness distribution images generated with different θx values. θx represents a rotational angle around the x-axis as in FIG. 1. That is, θx represents an inclination angle of the optical fiber 12 as in FIG. 2A. Specifically, θx represents an inclination angle of the optical fiber 12 relative to a plane the direction of the normal of which is the propagation direction of the collimated light. The brightness distribution images in FIGS. 10A to 10C have been obtained when θy is 0 and θz is 0.

FIG. 10B illustrates a brightness distribution image generated when θx is 0. When θx is 0, this state is equivalent to a state in which the optical fiber 12 is maintained at the target orientation with respect to angle θx. Specifically, when θx is 0, this state is equivalent to a state in which the optical fiber 12 is maintained parallel to the mounting surface of the optical device chip 11. In this state, a brightness distribution line appears at the center of the brightness distribution image.

FIG. 10A illustrates a brightness distribution image generated when the optical fiber 12 is inclined in the negative direction (θx=−0.5 degree). In this state, a brightness distribution line appears on the right side when compared with the brightness distribution line generated when θx is 0. FIG. 10C illustrates a brightness distribution image generated when the optical fiber 12 is inclined in the positive direction (θx=0.5 degree). In this state, a brightness distribution line appears on the left side when compared with the brightness distribution line generated when θx is 0.

When θx changes, the position (coordinate of the brightness distribution image in the horizontal direction) at which a brightness distribution line appears changes in this way. That is, the position (coordinate of the brightness distribution image in the horizontal direction) at which a brightness distribution line appears is determined by θx.

Figure 11A:
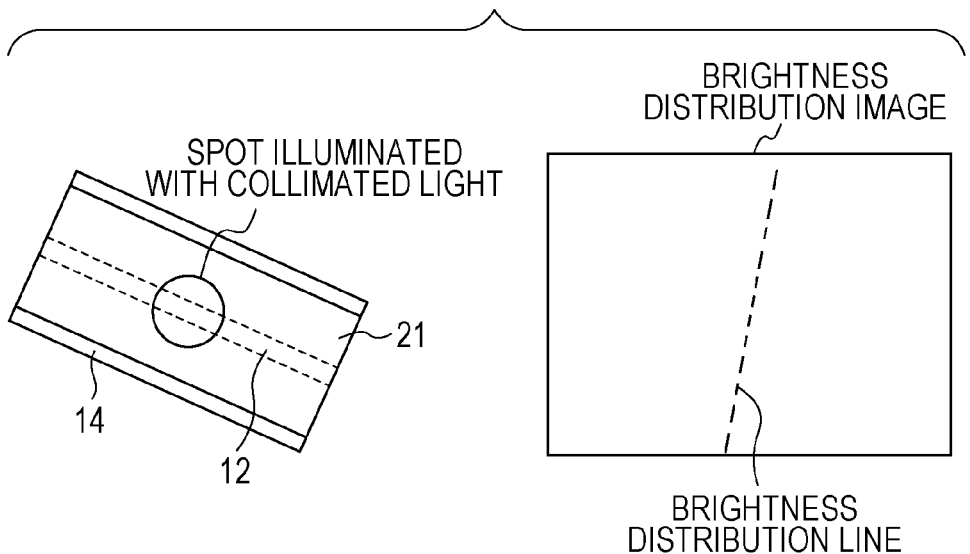
FIGS. 11A to 11C illustrate examples of brightness distribution images generated with different $\theta y$ values.
Figure 11B:
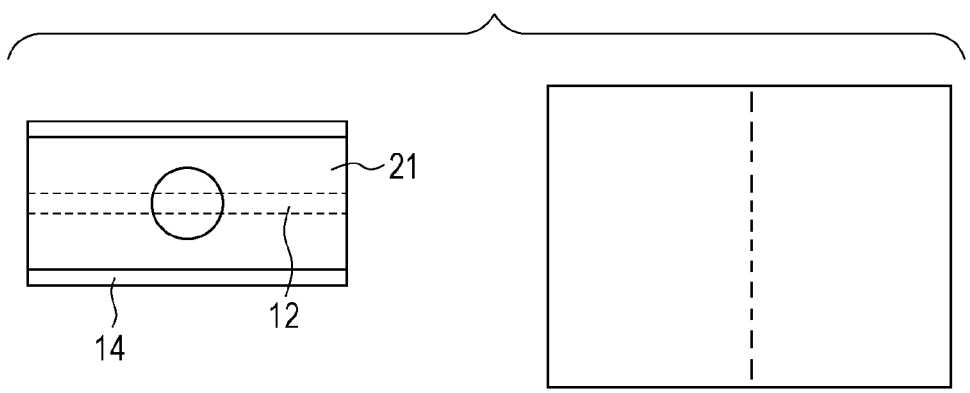
Figure 11C:
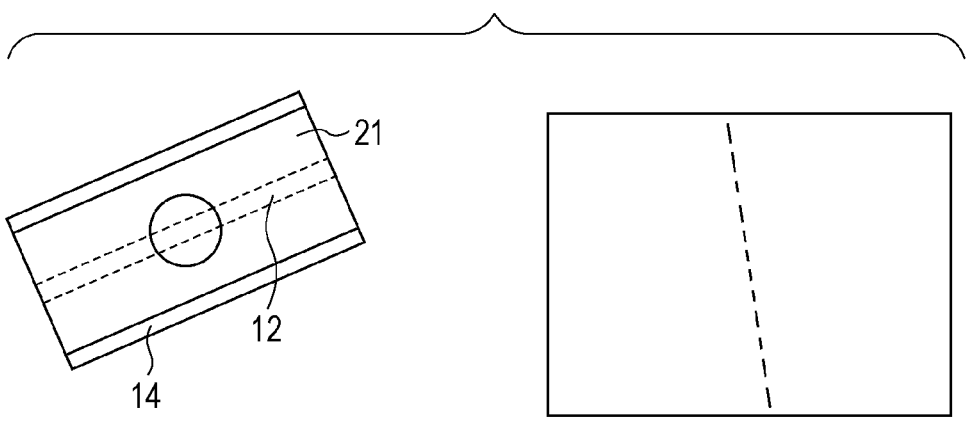

FIGS. 11A to 11C illustrate examples of brightness distribution images generated with different θy values. θy represents a rotational angle around the y-axis as in FIG. 1 or FIG. 2B. That is, θy represents an angle of the optical fiber 12 in a certain direction on a plane the direction of the normal of which is the propagation direction of the collimated light. The brightness distribution images in FIGS. 11A to 11C have been obtained when θx is 0 and θz is 0.

FIG. 11B illustrates a brightness distribution image generated when θy is 0. When θy is 0, this state is equivalent to a state in which the optical fiber 12 is maintained at the target orientation with respect to angle θy. In this state, a brightness distribution line appears so as to extend in the vertical direction (or perpendicular direction) of the brightness distribution image.

FIG. 11A illustrates a brightness distribution image generated when θy is −10 degrees. In this state, the brightness distribution line is inclined to the right. FIG. 11C illustrates a brightness distribution image generated when θy is 10 degrees. In this state, the brightness distribution line is inclined to the left.

When θy changes, the inclination of the brightness distribution line changes in this way. That is, the inclination of the brightness distribution line is determined by θy.

Figure 12A:
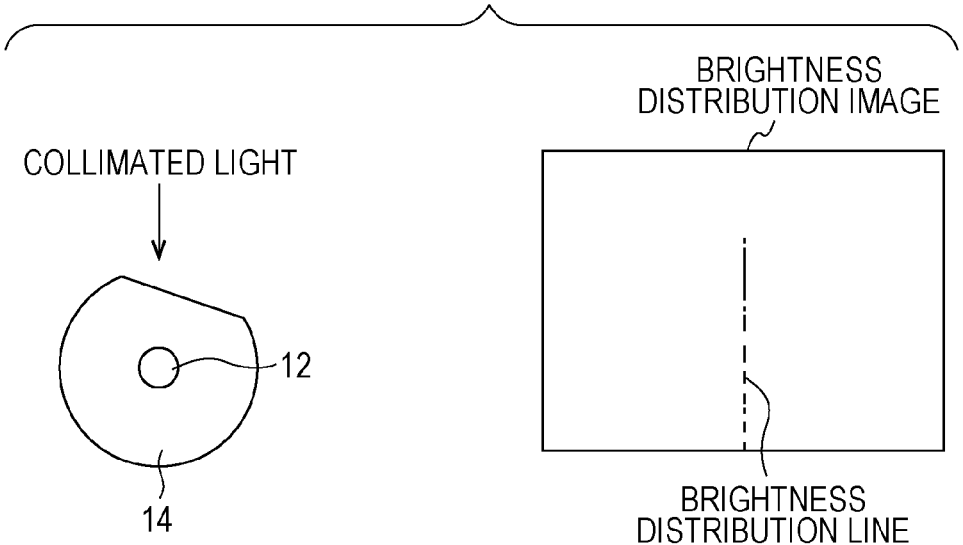
FIGS. 12A to 12C illustrate examples of brightness distribution images created with different $\theta z$ values.
Figure 12B:
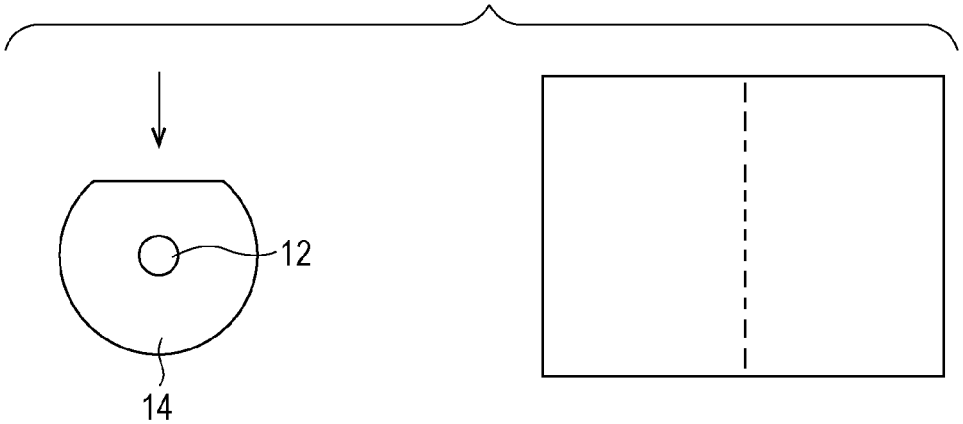
Figure 12C:
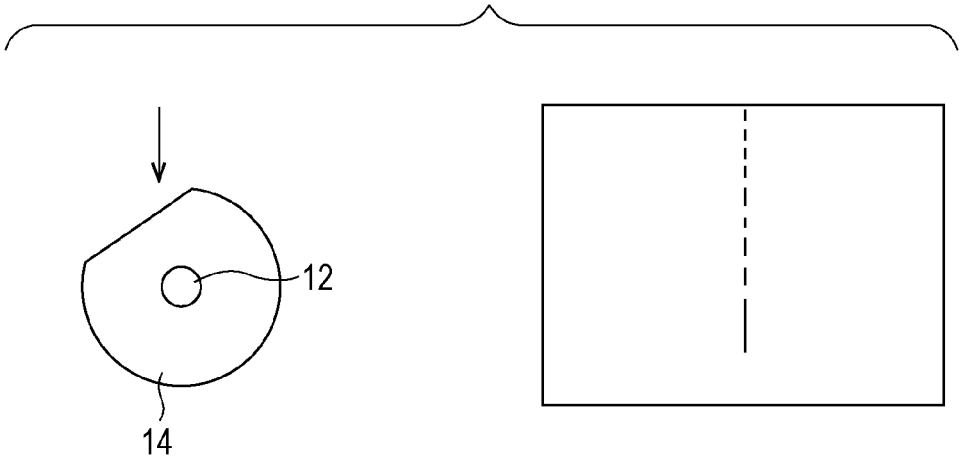

FIGS. 12A to 12C illustrate examples of brightness distribution images generated with different θz values. θz represents a rotational angle around the z-axis as in FIG. 1. That is, θz represents a rotational angle of the optical fiber 12 relative to the optical axis of the optical fiber 12, as in FIG. 2C. The brightness distribution images in FIGS. 12A to 12C have been obtained when θx is 0 and θy is 0.

FIG. 12B illustrates a brightness distribution image generated when θz is 0. When θz is 0, this state is equivalent to a state in which the optical fiber 12 is maintained at the target orientation with respect to angle θz. Specifically, when θz is 0, this state is equivalent to a state in which the direction of a polarized wave maintained by the optical fiber 12 matches a predetermined direction.

FIG. 12A illustrates a brightness distribution image generated when θz is −0.5 degree. In this state, a brightness distribution line appears below when compared with the brightness distribution line generated when θz is 0. FIG. 12C illustrates a brightness distribution image generated when θz is 0.5 degree. In this state, a brightness distribution line appears above when compared with the brightness distribution line generated when θz is 0.

When θz changes, the position (coordinate of the brightness distribution image in the perpendicular direction) at which a brightness distribution line appears changes in this way. That is, the position (coordinate of the brightness distribution image in the perpendicular direction) at which a brightness distribution line appears is determined by θz.

The orientation detecting apparatus 30 in the embodiment uses the relationships described above to detect the orientation of the optical fiber 12. Specifically, the orientation detecting apparatus 30 detects the orientation of the optical fiber 12 according to the position and inclination angle of the brightness distribution line that appears on the brightness distribution image.

In the orientation detection method in the embodiment, the target orientation of the optical fiber 12 is specified. For example, the target orientation of the optical fiber 12 is specified as described below.

(1) The optical fiber 12 is placed on a plane that is parallel to the mounting surface of the optical device chip 11. This condition is stipulating by setting θx to 0.

(2) The optical fiber 12 is placed so as to extend in the same direction as the direction in which the input optical waveguide 13 (input optical waveguide 13a or output optical waveguide 13b) of the optical device chip 11 propagates light. This condition is stipulating by setting θy to 0.

(3) The direction of the polarized wave maintained by the optical fiber 12 is perpendicular to the mounting surface of the optical device chip 11. This condition is stipulating by setting θz to 0.

The orientation detecting apparatus 30 detects the orientation of the optical fiber 12 with respect to the above target orientation. In this case, when the orientation detector 36 detects the relative position (coordinate in the horizontal direction) of the brightness distribution line appearing on the brightness distribution image, with respect to the brightness distribution line corresponding to the target orientation illustrated in FIG. 10B, θx be calculated. When the orientation detector 36 detects the relative inclination angle of the brightness distribution line appearing on the brightness distribution image, with respect to the brightness distribution line corresponding to the target orientation illustrated in FIG. 11B, θy be calculated. When the orientation detector 36 detects the relative position (coordinate in the perpendicular direction) of the brightness distribution line appearing on the brightness distribution image, with respect to the brightness distribution line corresponding to the target orientation illustrated in FIG. 12B, θz be calculated.

Figure 13:
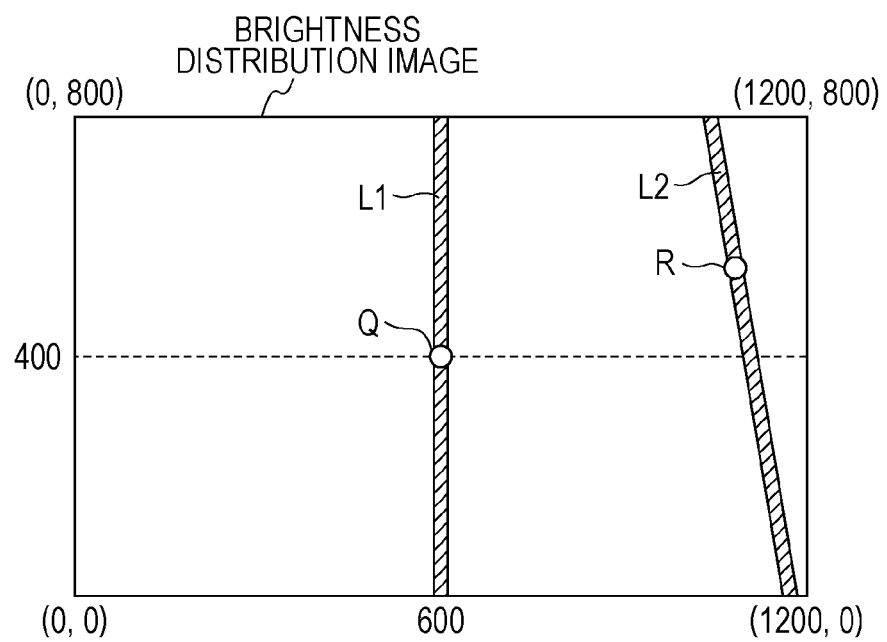
FIG. 13 illustrates the orientation of the optical fiber and the position of a brightness distribution line.

FIG. 13 illustrates the orientation of the optical fiber 12 and the position of the brightness distribution line. The line L1 represents the brightness distribution line obtained when the optical fiber 12 is maintained in the target orientation. As illustrated in FIG. 13, the line L1 is positioned at the center of the brightness distribution image in the horizontal direction. The line L1 also extends on the brightness distribution image in the perpendicular direction. The orientation detecting apparatus 30 is set so that when the optical fiber 12 is maintained in the target orientation, the line L1 is obtained.

The line L2 represents the brightness distribution line obtained when collimated light is directed to the optical fiber 12. The line L2 is obtained by having the line L1 undergo parallel displacement from a point Q to a point R and then inclining the line L1. Parallel displacement from the point Q to the point R is achieved when angles θx and θz are given to the optical fiber 12. The brightness distribution line to be inclined when angle θy is given to the optical fiber 12.

Accordingly, to detect θx and θz, the orientation detecting apparatus 30 detects parallel displacement from the point Q to the point R on the brightness distribution image. In this example, the point Q is set at the central coordinates (600, 400) of the brightness distribution image. Therefore, the orientation detecting apparatus 30 identifies the coordinates of the point R to detect θx and θz. θx and θz will be calculated by using the point R on the non-aligned optical fiber 12 which is represented by L2, and accordingly the point R will be referred to below as the reference point.

To identify the reference point described above, the orientation detector 36 compares the brightness distribution line appearing on the brightness distribution image with the reference distribution pattern L1, which is prepared in advance. The orientation detector 36 identifies the coordinates of the reference point used to calculate θz and θx, according to the comparison result.

Figure 14:
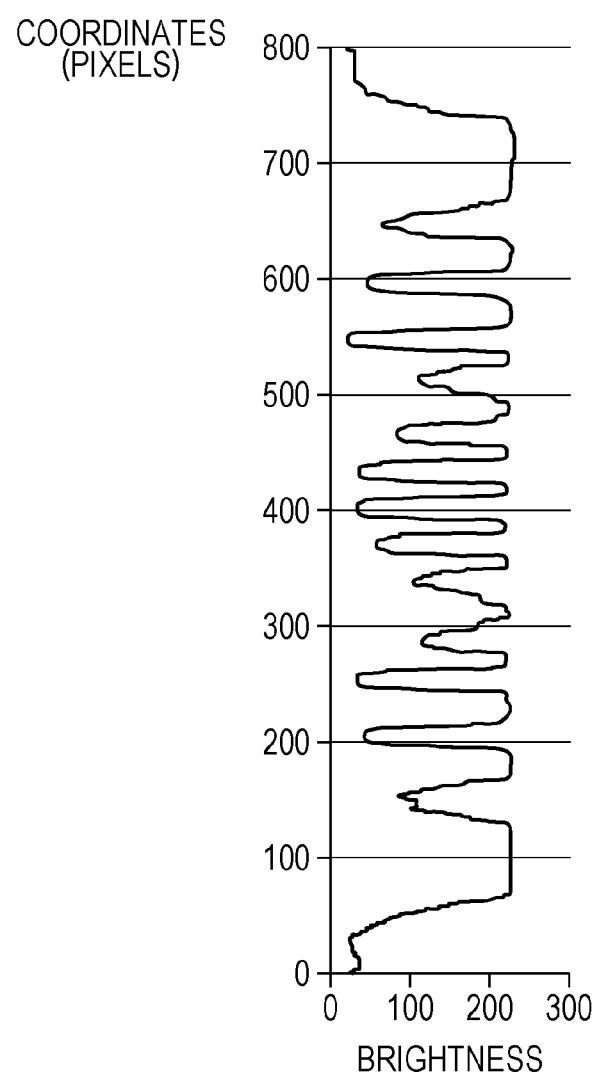
FIG. 14 illustrates an example of a reference distribution pattern.

FIG. 14 illustrates an example of the reference distribution pattern. The reference distribution pattern represents a brightness distribution (interference fringe pattern) obtained when collimated light is directed to the optical fiber 12 maintained in a predetermined orientation. In FIG. 14, the vertical axis represents coordinates of the brightness distribution image in the perpendicular direction. In this example, the size of the brightness distribution image is 800×1200 pixels as illustrated in FIG. 13, so 0 indicates the pixel at the lower end of the brightness distribution image and 800 indicates the pixel at the upper end. The horizontal axis indicates brightness. In this example, the brightness of each pixel is represented by eight-bit data (one of 0 to 255).

The reference distribution pattern represents a brightness distribution obtained in correspondence to the reflected light from the optical fiber 12 and the reflected light from the ferrule 14 when, for example, the optical fiber 12 is adjusted to a target orientation. That is, the reference distribution pattern represents an interference fringe pattern of a brightness distribution line obtained in correspondence to reflected light when the optical fiber 12 is adjusted to the target orientation. The target orientation of the optical fiber 12 in this example is represented by θx=0, θy=0, and θz=0. In the example in FIG. 13, the reference distribution pattern is the line L1.

When collimated light is directed through the orientation flat 21 of the ferrule 14 to the optical fiber 12, a distribution of angles at which reflected light rays are led is substantially symmetrical with respect to the center of the distribution, as illustrated in FIG. 9B. Accordingly, the interference fringe pattern of the brightness distribution corresponding to the reflected light from the optical fiber 12 and the reflected light from ferrule 14 is also substantially symmetrical with respect to the center of the pattern. When the optical fiber 12 is maintained in the target orientation, the interference fringe pattern of the brightness distribution is symmetric with respect to the center of the brightness distribution image. On the reference distribution pattern in FIG. 14, therefore, a brightness distribution image from coordinate 400 to coordinate 800 and a brightness distribution image from coordinate 400 to coordinate 0 are substantially symmetric with each other.

The reference distribution pattern is generated in advance through, for example, a measurement or simulation. The interference fringe pattern of the brightness distribution line obtained when collimated light is directed to the optical fiber 12 is determined according to the diameter and material of the optical fiber 12, the shape and material of the ferrule 14, and other properties. Data representing the reference distribution pattern is stored in the brightness-distribution database 37.

Figure 15:
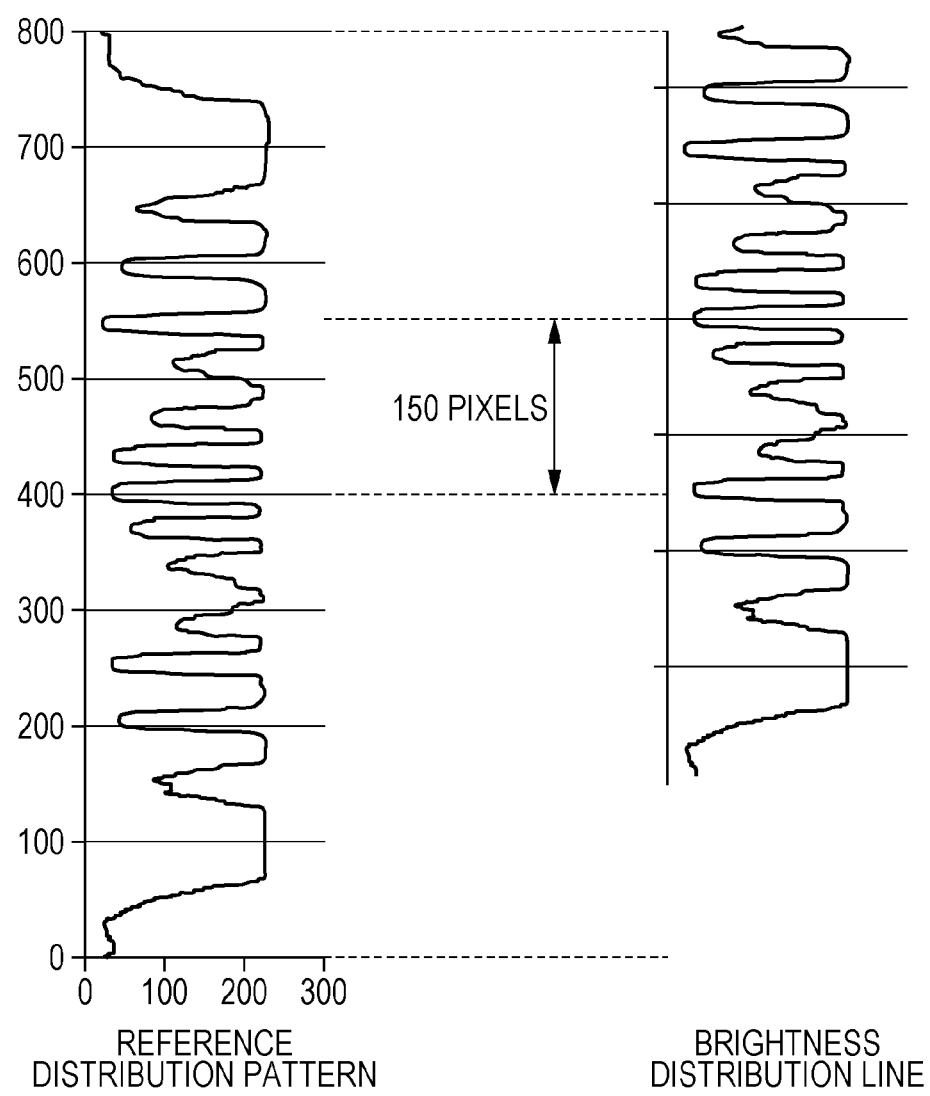
FIG. 15 illustrates an example of comparison.

The orientation detector 36 obtains brightness distribution data representing the brightness distribution line that has appeared on the brightness distribution image. The orientation detector 36 then compares the brightness distribution line appearing on the brightness distribution image with the reference distribution pattern, as illustrated in FIG. 15. In this comparison, the orientation detector 36 shifts the reference distribution pattern, for example, one pixel at a time and calculates a correlation between the interference fringe of the reference distribution pattern and the interference fringe of the brightness distribution line for each shift. In the example in FIG. 15, when the reference distribution pattern is shifted 150 pixels, the brightness distribution image substantially matches the reference distribution pattern. In this case, the orientation detector 36 identifies the reference point according to a shift of 150 pixels.

Figure 16:
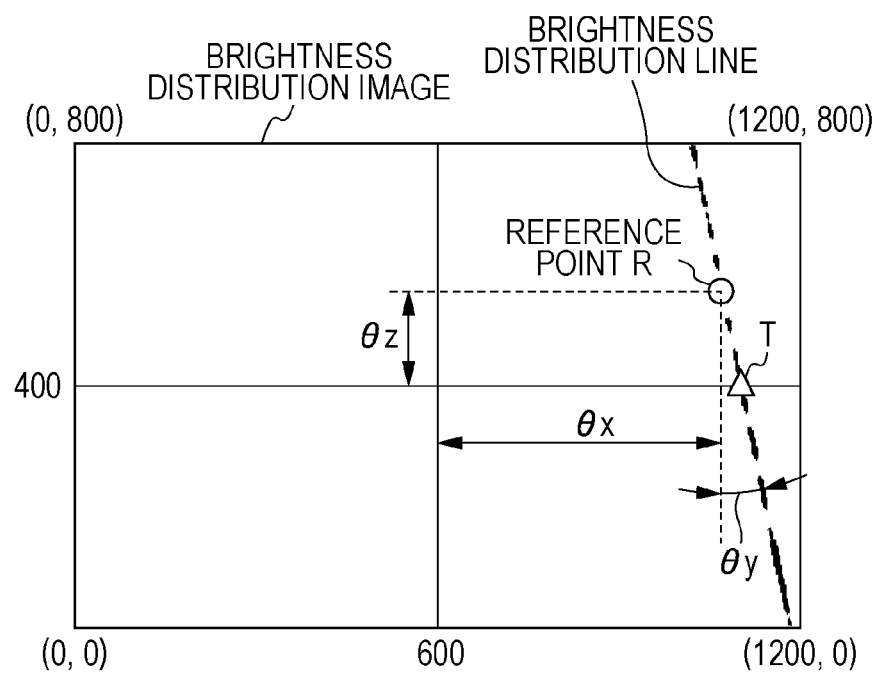
FIG. 16 illustrates a method of calculating $\theta x$, $\theta y$, and $\theta z$ according to a reference point.

FIG. 16 illustrates a method of calculating $\theta x$, $\theta y$, and $\theta z$ according to the reference point. The coordinates of the reference point are determined according to the result of comparison between the brightness distribution line and the reference distribution pattern. In an example, a start point T on the brightness distribution image is first determined. The start point T is an intersection between the brightness distribution line and a straight line representing a perpendicular coordinate of 400. When a shift of 150 pixels has been obtained in the comparison in FIG. 15, a point at a distance of 150 pixels from the start point T on the brightness distribution line is identified as the reference point R.

The orientation detector 36 calculates $\theta z$ and $\theta x$ on the brightness distribution image from the coordinates of the reference point R; $\theta z$ and $\theta x$ are represented by $\theta z = Kz \times Rz$ and $\theta x = Kx \times Rx$, where Rz represents the coordinate of the reference point in the perpendicular direction, Rx represents the coordinate of the reference point R in the horizontal direction, and Kz and Kx each represent a proportional coefficient. These proportional coefficients are obtained in advance through, for example, a measurement or simulation.

The orientation detector 36 detects $\theta y$ on the brightness distribution image according to the inclination angle of the brightness distribution line. In this example, the inclination angle of the brightness distribution line matches $\theta y$. Accordingly, $\theta y$ be detected by calculating the inclination angle of the brightness distribution line.

Figure 17:
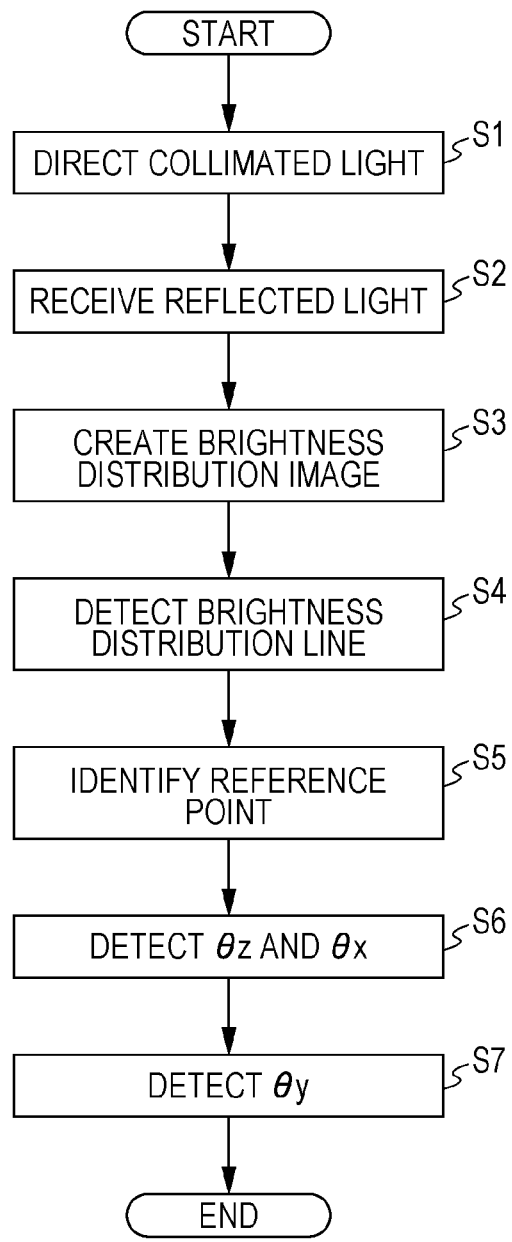
FIG. 17 is a flowchart illustrating an orientation detection method in an embodiment.

FIG. 17 is a flowchart illustrating the orientation detection method in the embodiment. Processing in this flowchart is executed when a command to detect the orientation of the optical fiber 12 is issued to the orientation detecting apparatus 30. The position of the optical fiber 12 is assumed to have been appropriately adjusted so that the optical fiber 12 and its corresponding input optical waveguide 13 are optically coupled before this flowchart is executed.

In S1, the auto collimator 31 uses the collimating unit 32 to direct collimated light to the optical fiber 12. Since the optical fiber 12 is accommodated in the ferrule 14, the collimated light is directed through the ferrule 14 to the optical fiber 12. In this case, the collimated light is directed substantially perpendicular to the orientation flat 21 of the ferrule 14, in which the optical fiber 12 is accommodated.

In S2, the auto collimator 31 uses the optical sensor device 33 to receive reflected light of the collimated light. In this case, the optical sensor device 33 receives reflected light from the optical fiber 12 and reflected light from the orientation flat 21 of the ferrule 14.

In S3, the brightness-distribution-image creating unit 35 creates a brightness distribution image according to output signals from the optical sensor device 33. When the collimated light is directed to the optical fiber 12 (and the ferrule 14), a brightness distribution line appears on the brightness distribution image. The brightness distribution line is generated from the reflected light detected in S2.

In S4, the orientation detector 36 detects the brightness distribution line appearing on the brightness distribution image generated in S3. The orientation detector 36 also obtains data representing the coordinates and brightness of each pixel on the brightness distribution line.

In S5, the orientation detector 36 identifies the coordinates of the reference point on the brightness distribution image according to positions of the brightness distribution line appearing on the brightness distribution image. The method of identifying the coordinates of the reference point according to points of the brightness distribution line is as described above with reference to, for example, FIGS. 14 to 16.

In S6, the orientation detector 36 detects $\theta z$ and $\theta x$ according to the coordinates of the reference point. In S7, the orientation detector 36 detects $\theta y$ according to the inclination angle of the brightness distribution line on the brightness distribution image. Processing in S7 may be executed between S4 and S5 or between S5 and S6.

Figure 18:
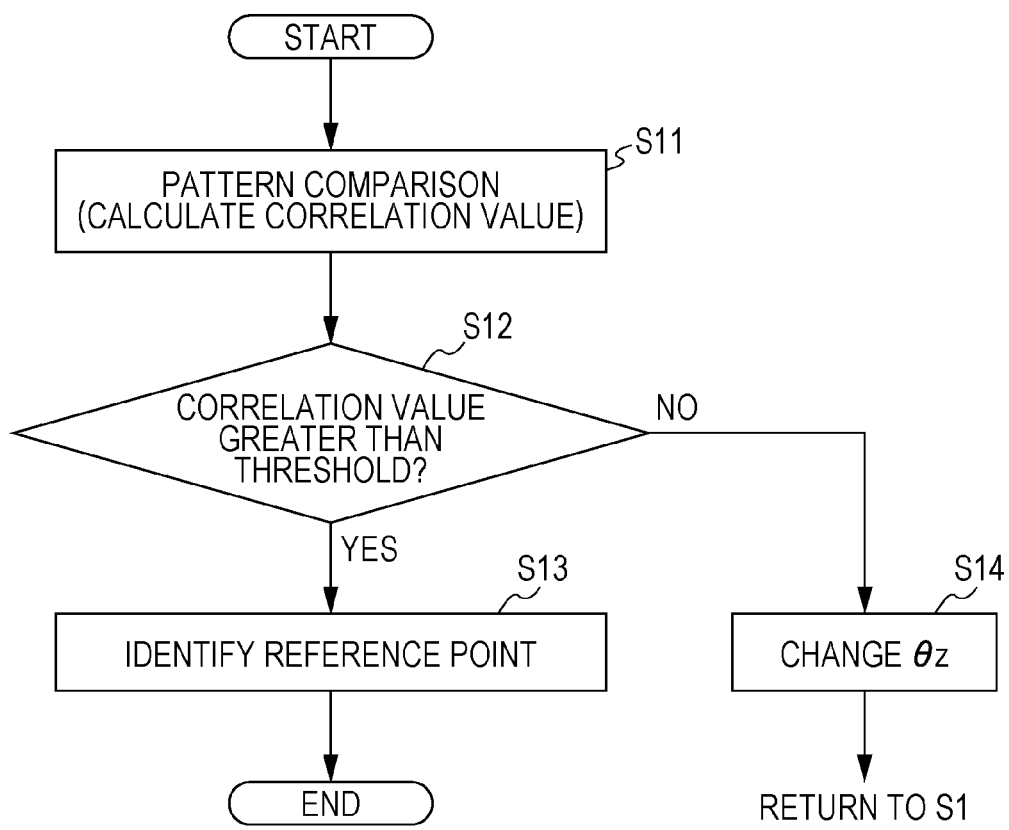
FIG. 18 is a flowchart illustrating a method of identifying the reference point.

FIG. 18 is a flowchart illustrating a method of identifying the reference point. Processing in this flowchart is an example of processing in S5 in FIG. 17.

In S11, the orientation detector 36 compares the brightness distribution line extracted from the brightness distribution image with the reference distribution pattern. Specifically, the orientation detector 36 calculates a correlation between data representing the brightness distribution line and data representing the reference distribution pattern. When, for example, the reference distribution pattern is shifted one pixel at a time and a correlation is calculated between the brightness distribution line and the reference distribution pattern for each shift, a shift at which the maximum correlation value is obtained is stored.

In S12, the orientation detector 36 compares the correlation value calculated in S11 (in the above example, the maximum correlation value) with a predetermined threshold. When the correlation value is larger the threshold, in S13 the orientation detector 36 identifies the coordinates of the reference point according to the position of the interference fringe of the brightness distribution line.

When the correlation value is smaller than or equal to the threshold, in S14 the orientation detector 36 commands the alignment apparatus 40 to change the value of $\theta z$. The alignment apparatus 40 adjusts the value of θz of the optical fiber 12 in response to the command from the orientation detector 36. Processing in the orientation detecting apparatus 30 then returns to S1. Thus, after a brightness distribution line preferable in detection of the orientation of the optical fiber 12 has been obtained, the orientation detecting apparatus 30 detects the orientation of the optical fiber 12.

In the orientation detection method in the embodiment, the orientation of an optical fiber that is optically coupled to an optical device may be detected by using an auto collimator and image processing. In the orientation detection method in the embodiment, the orientation of an optical fiber may be detected even when light is directed to the optical fiber only in one direction.

Another Embodiment

The coordinates of the reference point R may be identified by another method. For example, on the brightness distribution image, the orientation detector 36 may compare the brightness distribution line with the reference distribution pattern illustrated in FIG. 14. In this comparison, the orientation detector 36 detects a pixel corresponding to a coordinate of 400 on the reference distribution pattern (or a pixel corresponding to the point Q on the line L1 illustrated in FIG. 13) on the brightness distribution line. The orientation detector 36 then uses the pixel detected as described above as the reference point.

Alternatively, the orientation detector 36 may identify the reference point by using the symmetry of the interference fringe of the brightness distribution line. In this method, the orientation detector 36 identifies, as the reference point, a point with respect to which the interference fringe of the brightness distribution line is symmetrical.

In still another method, a brightness distribution image is generated for each of two different θz angles. For example, when collimated light is directed to the vicinity of edges on the both sides of the orientation flat 21, a brightness distribution image is generated for each edge. The reference point is identified according to the position of the brightness distribution line appearing on each brightness distribution image.

In the embodiments described above, the ferrule 14 has been shaped in a cylindrical form. However, the present disclosure is not limited to this structure. It suffices that the maintaining member that accommodates the optical fiber has a flat surface as at least part of the surface of the maintaining member.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of detecting an orientation of an optical fiber that is provided in an optical-transparent maintaining member including a flat surface as a part of a surface of the maintaining member, the method comprising:
    directing collimated light to the optical fiber through the flat surface of the maintaining member;
    receiving reflected light of the collimated light by using an optical sensor device;
    generating a brightness distribution image according to an output signal from the optical sensor device;
    identifying a reference point on a brightness distribution line appearing on the generated brightness distribution image, according to a position of the brightness distribution line in relation to a target orientation for the optical fiber, the brightness distribution line detectable on the brightness distribution image in correspondence to the reflected light received by the optical sensor device; and
    detecting the orientation of the optical fiber according to a coordinate of the reference point on the brightness distribution image.

2. The method according to claim 1, wherein the coordinate of the reference point is identified by comparing the brightness distribution line with a target distribution pattern representing a predetermined brightness distribution for the target orientation.

3. The method according to claim 2, wherein the target distribution pattern represents a brightness distribution obtained when the collimated light is directed to the optical fiber maintained in the target orientation.

4. The method according to claim 1, wherein a rotational angle of the optical fiber around an optical axis of the optical fiber is detected according to the coordinate of the reference point.

5. The method according to claim 1, wherein an inclination angle of the optical fiber is detected relative to a plane, a direction of a normal of the plane being a propagation direction of the collimated light, according to the coordinate of the reference point.

6. The method according to claim 1, wherein an angle of the optical fiber is detected relative to a certain direction on a plane, a direction of a normal of the plane being a propagation direction of the collimated light, according to an inclination angle of the brightness distribution line on the brightness distribution image.

7. An apparatus that detects an orientation of an optical fiber that is provided in an optical-transparent maintaining member including a flat surface as a part of a surface of the maintaining member, the apparatus comprising:
    an optical system configured to direct collimated light to the optical fiber through the flat surface of the maintaining member and to receive reflected light of the collimated light; and
    a computing processing system to:
        calculate a brightness distribution image according to an output signal from the optical sensor device; and
        identify a reference point on the brightness distribution image according to a position of a brightness distribution line, the brightness distribution line being formed on the brightness distribution image in correspondence to the reflected light received by the optical sensor device, and detect the orientation of the optical fiber according to a coordinate of the reference point on the brightness distribution image.

* * * * *